United States Patent [19]

Jones

[11] Patent Number: 4,888,217
[45] Date of Patent: Dec. 19, 1989

[54] SILICONE FOAM MASSES

[75] Inventor: Gareth M. Jones, Penarth, Scotland

[73] Assignee: Dow Corning Limited, London, England

[21] Appl. No.: 338,081

[22] Filed: Apr. 14, 1989

[30] Foreign Application Priority Data

Apr. 20, 1988 [GB] United Kingdom ................ 8809293

[51] Int. Cl.$^4$ ............................................. B05D 7/22
[52] U.S. Cl. .................................... 427/236; 427/387; 521/154
[58] Field of Search ................. 427/236, 387; 521/154

[56] References Cited

U.S. PATENT DOCUMENTS 4,026,842 3/1977 Lee et al. .......................... 260/2.5 S
4,026,845 11/1977 Kim et al. ......................... 260/2.5 S

FOREIGN PATENT DOCUMENTS 1522637 4/1978 United Kingdom .

*Primary Examiner*—Morton Foelak
*Attorney, Agent, or Firm*—Edward C. Elliott

[57] ABSTRACT

The specification describes and claims a method of producing a foamed mass having a density of less than 150 kg/m$^3$ adherent to surfaces of a cavity which comprises inserting into the cavity a foamable composition formed by mixing impinging jets of two or more parts of a foamable silicone composition capable of curing at 20° C. within 2 minutes to provide a foamed mass having a density of less than 150 kg/m$^3$. The Compositions comprises (a) one or more polysiloxanes having not less than three alkylhydrogensiloxane units per molecular, (b) one or more polysiloxanes having not less than two silicon-bonded hydroxyl groups per molecule, (c) one or more compounds having carbon-bonded hydroxyl groups present in a proportion to provide from 0 to 2% by weight of the composition, (d) a polyorganosiloxane compriing $[F(CF_2)_m(CH_2)_nO]_pSiO_{4-p/2}$, $R_3SiO_{\frac{1}{2}}$ and $SiO_{4/2}$ units and silicon-bonded hydroxyl groups wherein each R represents a monovalent hydrocarbon group containing from 1 to 20 carbon atoms, m is an integer having an average value from 1 to 20, n has the value 1 or 2, p has the value 1, 2 or 3 and (e) a platinum catalyst for promoting reaction between the ingredients. The composition is provided as said two or more parts, each of the parts having a similar viscosity at 25° C. one to the other, which is less than 15000 mm$^2$/s and the components being present in the mixed composition in proportions such that the ratio of silicon-bonded hydrogen atoms of said one or more polysiloxanes having not less than three alkylhydrogen siloxane units per molecule to silicon-bonded hydroxyl groups and carbon-bonded hydroxyl groups of the other components of the composition lies in the range 1:1 to 6:1. The method enables rapid production of foamed in situ masses having sound deadening and fire resistant properties, suitable for use for example in automobiles.

9 Claims, No Drawings

SILICONE FOAM MASSES

This invention is concerned with improvements in or relating to production of silicone foam masses.

Liquid, foam forming, curable compositions are available which flow and foam readily at room or slightly elevated temperature to provide a cured foam product. Platinum catalysed compositions are preferred for various applications in preference to tin catalysed materials. Conventional silicone based compositions generally require at least several minutes to cure at ambient temperature to a self-supporting condition and do not usually provide foams having a density of less than 150 kg/m$^3$. Platinum catalysed foam forming compositions are disclosed for example in U.S. Pat. Nos. 4,026,842, 4,026,845 and G.B. patent specification No. 1 522 637. When known platinum catalysed silicone based compositions are used within hollow metal sections and in contact therewith, the cure may be inhibited due, for example, to the influence of materials present within the section upon catalysts used in the composition and so the cure within hollow metal sections may require a significant period of time. In addition, foam formed by use of these known materials applied to certain surfaces (e.g. epoxy resin coated surfaces in box sections) shows no adhesion to the surface and may even exhibit an uncured, liquid surface layer. It is believed that inhibition of the cure mechanism and the failure of cure at the surface of the foam are due to inhibition of the platinum catalyst by compounds present on the surface of the metal section or present on the surface of coatings applied thereto.

It is increasingly desirable to fill cavities with in situ formed foams for example for acoustic purposes in vehicles. Use of conventional silicone based room temperature vulcanisable foam compositions for this purpose is inhibited by their comparatively slow curing rates. Various proposals have been made to overcome the difficulties involved but there remains a need for a simple method to insert the foamable composition quickly into confined cavities and for the inserted material to cure rapidly to the desired foam structure. With a view to enabling rapid insertion of the composition to a confined cavity it is proposed to employ a jet impingement mixer dispenser for rapid mixing of impinging streams of components of the composition and insertion of the composition into the cavity. However, whilst such a procedure is attractive from the user point of view, slow cure of the composition within the cavity and poor adhesion within the cavity for the reasons aforesaid, coupled with difficulty in providing streams of the components of a viscosity acceptable for adequate mixing of impinging streams of the components renders conventional silicone based room temperature vulcanisable foam compositions unsuitable for such use.

We have now found that one may produce a foamed mass having a density of less than 150 kg/m$^3$ adherent to surfaces of a cavity by mixing impinging jets of components of an improved platinum catalysed silicone based foam composition.

The present invention provides in one of its aspects a method of producing a foamed mass having a density of less than 150 kg/m$^3$ adherent to surfaces of a cavity which comprises inserting into the cavity a foamable composition formed by mixing impinging jets of two or more parts of a foamable silicone composition capable of curing at 20° C. within 2 minutes to provide a foamed mass having a density of less than 150 kg/m$^3$ comprising as its principle or sole components (a) one or more polysiloxanes having not less than three alkylhydrogensiloxane units per molecule, (b) one or more polysiloxanes having not less than two silicon-bonded hydroxyl groups per molecule, (c) one or more compounds having carbon-bonded hydroxyl groups present in a proportion to provide from 0 to 2% by weight of the composition, (d) a polyorganosiloxane comprising $[(F(CF_2)_m(CH_2)_nO]_pSiO_{4-p,/2}$, $R_3SiO_{\frac{1}{2}}$ and $SiO_{4/2}$ units and silicon-bonded hydroxyl groups wherein each R represents a monovalent hydrocarbon group containing from 1 to 20 carbon atoms, m is an integer having an average value from 1 to 20, n has the value 1 or 2, p has the value 1, 2 or 3 and (e) a platinum catalyst for promoting reaction between the ingredients, the composition being provided as said two or more parts for admixture to form said composition, each of the parts having a similar viscosity at 25° C. one to the other, which is less than 15000 mm$^2$/s and the components being present in the mixed composition in proportions such that the ratio of silicon-bonded hydrogen atoms of said one or more polysiloxanes having not less than three alkylhydrogen siloxane units per molecule to silicon-bonded hydroxyl groups and carbon-bonded hydroxyl groups of the other components of the composition lies in the range 1:1 to 6:1.

Foamable compositions suitable for use in a method according to the invention foam during curing; the compositions are curable to form a polysiloxane matrix which is foamed by evolution of hydrogen gas in presence of the platinum catalyst according to the scheme $$\equiv SiH + HOQ \rightarrow \equiv SiOQ + H_2.$$

Suitable polysiloxanes having alkylhydrogensiloxane units include polymers having units according to the general formula $$R_qHSiO_{(\frac{3-q}{2})}$$

in which each R represents a lower alkyl or phenyl group e.g. a methyl group, and q is 1 or 2. The alkylhydrogen polysiloxanes may also comprise units $$R_sSiO_{(\frac{4-s}{2})}$$

in which R is as referred to above and s is 1, 2 or 3. Reactions of the preferred compositions to generate hydrogen gas and to cure the mass through chain extension and crosslinking within the desired time span are dependant on presence of appropriate proportions of the inter-active substituents and the alkylhydrogen polysiloxane is selected accordingly. Preferably this polysiloxane has from 0.5% to 2.5% by weight of silicon-bonded hydrogen atoms. We prefer that each R represents a methyl group (Me). Preferably terminal groups of the alkylhydrogen polysiloxane have the formula $$R_3SiO_{\frac{1}{2}}$$

where each R represents a methyl group. Suitable alkylhydrogen polysiloxanes include those comprising MeHSiO units with or without the presence of Me$_2$SiO units and having viscosities of the order of from about 1 to about 1000 mm$^2$/s more preferably from about 10 to about 100 mm$^2$/s at 25° C.

Suitable polysiloxanes having silicon-bonded hydroxyl groups are polymers which include units according to the general formula $$R_r(OH)SiO_{\frac{3-r}{2}}$$

in which each R represents a lower alkyl or phenyl group e.g. a methyl group and r is 1 or 2. These polysiloxanes also comprise units $$R_sSiO_{\frac{4-s}{2}}$$

in which R and s are as referred to above. These materials are preferably liquids and are chosen so that their functionality and chain length are appropriate in relation to the viscosity required of the composition, the amount of hydrogen evolution and the degree of chain extension and crosslinking required during curing of the composition. The polysiloxanes having silicon-bonded hydroxyl groups are preferably silanol terminated polydiorganosiloxanes according to the general formula $$HO((R_2)SiO)_tH$$

in which each R represents a methyl group and t has a value up to about 25 such that the polysiloxane has a viscosity of about 30 to about 60 mm²/s at 25° C. Preferred materials have a viscosity of about 40 to about 45 mm²/s. Preferably the one or more polysiloxanes having not less than two silicon-bonded hydroxyl groups per molecule also comprise longer chain silanol terminated polydiorganosiloxanes of the formula $$HO(R_2SiO)_{t'}H$$

where each R is as aforesaid and t' is an integer such that the polysiloxane has a viscosity of about 50 mm²/s to about 2,500 mm²/s. Preferred materials have viscosities of the order of about 1,500 mm²/s to about 2,500 mm²/s, and about 12000 mm²/s to 15,000 mm²/s at 25° C.

One may also include in the composition appropriate quantities of higher functional materials as crosslinking agents. Suitable crosslinking agents include materials having three or more functional e.g. hydroxy groups per molecule. Preferred crosslinking agents include an alkoxy-silane and/or a condensation product thereof capable of combining with three or more hydroxy polysiloxane molecules with release of the corresponding alcohol of the alkyl radicals, e.g. methyl trimethoxysilane, n-propylortho-silicate and ethyl polysilicate.

Compositions for use in a method according to the invention may, and preferably do, also include one or more compounds having carbon-bonded hydroxyl groups. This component (c) influences the structure of foams formed and has a significant influence on lowering the density of the cured foam. Suitable materials include the aliphatic and araliphatic alcohols and especially lower aliphatic monofunctional alcohols having up to 8 carbon atoms, e.g. methanol, n-propyl alcohol, and benzyl alcohol. The component (c) is preferably present to an extent of up to 2% by weight of the composition as a whole. Its presence contributes to low density properties of the foams produced, but including too large a proportion of it leads to a reduction in the ability of the composition to cure satisfactorily.

The component (d) of a composition for use in a method according to the invention is a polyorganosiloxane comprising $[F((CF_2)_m(CH_2)_nO]_pSiO_{(4-p)/2}$, $R_3SiO_{4/2}$ units and silicon-bonded hydroxyl groups wherein each R represents a monovalent hydrocarbon group containing from 1 to 20 carbon atoms, m is an integer having an average value of from 1 to 20, n has the value 1 or 2 and p has the value 1, 2 or 3. This polysiloxane may also include from 0 to 10 percent, based on the weight of said polyorganosiloxane, of $GSiO_{3/2}$ units wherein G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule. These materials are more fully described and claimed in European Patent Specification No. 179 598.

In preferred polyorganosiloxanes (d), the molar ratio of $R_3SiO_{\frac{1}{2}}$ units to the total number of $[(CF_2)_m(CH_2)_nO]_pSiO_{(4-p)/2}$, $SiO_{4/2}$ units and $GSiO_{3/2}$ units is from 0.3 to 1.3. Preferably m represents an even integer and the average value of m is 8, n is 2 and p is 1.

Suitable polyorganosiloxanes (d) include those in which the concentration of $[F(CF_2)_m(CH_2)_2]_pSiO_{(4-p)/2}$ units is sufficient to impart a surface tension of less than $2.2 \times 10^{-4}$ newtons per centimeter at 25° C. to a 10% by weight solution of said polyorganosiloxane in a hydroxyl endblocked polydimethylsiloxane exhibiting a viscosity of 0.08 mm²/s at 25° C.

The preferred components (d) are the products of treatment of hexamethyldisiloxane coated polysilicates treated with the alcohol $F(CF_2)_8CH_2CH_2OH$ to react with some at least of the silicon-bonded hydroxyl groups of the polysilicate. The preferred components (d) of a composition according to the invention are polydiorganosiloxanes having minor amounts (e.g. up to 3%, preferably less than 1% by weight) of silicon-bonded hydroxyl groups which contribute to the total silicon-bonded hydroxyl groups of the composition.

Platinum catalysts (e) may take any of the known forms, ranging from platinum as deposited on carriers such as silica gel or powdered charcoal, to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on colour of the mixture. Platinum complexes may also be used e.g. those prepared from chloroplatinic acid hexahydrate and divinyl tetramethyldisiloxane. If desired, platinum catalyst inhibitors e.g. example less than 2000 mm²/s and may be less than 1500 loxanes may be included, although their rate controlling characteristics should be such that rapid setting of the deposited mixed composition is not undesirabley extended.

The proportions of the components (a), (b), (c), (d) is immediately inserted into the cavity. Suitably, the atoms of component (a) to hydroxyl groups provided by the ingredients (b), (c), (d) is in the range 1:1 to 6:1, more preferably in the range 4:1 to 5:1 in order to obtain maximum adhesion properties. If the ratio is less than 1:1 the compositions cure slowly to provide foams of higher density whereas if the ratio is greater than 6:1 the foams are of less elastomeric form.

Compositions according to the invention foam and cure when mixed at room temperature and humidity. Accordingly, the component (a) is stored separated from the other components until required for use. In order to enable simplicity and ease of mixing the components at the application site, it is preferred to store the compositions in two-part form in which each of the parts is of substantially the same viscosity. For example, a first part may comprise the components (a) and (d) and a portion of component (b), and a second part may comprise the remainder of the component (b), and the components (c) and (e) so that the first and second parts may be mixed together in a ratio of 1:1 by volume or 1:1 by weight as desired.

If desired, minor amounts of other materials may be included in a composition for use in a method according to the invention, for example, fillers, colorants, extenders and other crosslinking agents. However, in general, the inclusion of fillers is generally undesirable in a composition intended for mixing and dispensing via a jet impingement mixer. For such application, the viscosity of each of the parts of the composition is less than 15000, for example less than 2000 mm$^2$/s and may be less than 1500 mm$^2$/s, for example about 1000 mm$^2$/s or less at 25° C.

In a method according to the invention impinging jets of the parts of the composition are mixed as they pass through a jet impingement mixer and the mixed composition is immediately inserted into the cavity. Suitably, the jets are under a pressure in the range 100 to 3000 pounds per square inch ($6.9 \times 10^6$ to $2.07 \times 10^7$ Pa). Those compositions whose parts have viscosities of the order of about 1000 mm$^2$/s or less at 25° C. flow readily within cavities and penetrate grooves and crevices to a considerable extent before becoming highly viscous and then cured within two minutes of mixing. Those compositions whose parts have viscosities at the higher end of the given viscosity range flow less readily and are more appropriate for use in cavities from which the composition is more likely to escape prior to cure. In order to achieve a desirable foam structure when using those compositions whose parts have the higher viscosities it may be necessary to introduce air under pressure to the chamber in which the jets are mixed in order to promote turbulent mixing conditions for the jets of the parts of the composition, but this is not essential when using the compositions whose parts have viscosities of less than about 1000 mm$^2$/s at 25° C. When used, the air may be introduced under a pressure of about 1.5 to 6 Bar ($1.5 \times 10^5$ to $6 \times 10^5$ Pa). We have found that compositions can be formulated for ready mixing and dispensing by a jet impingement mixer and to cure within 90 seconds of mixing the composition at room temperature (i.e. of the order of 18° C.±2° C.) and humidity (i.e. about 50% relative humidity) to provide cured foams of a density between about 60 kg/m$^3$ and 110 kg/m$^3$. The foams are extremely fine pored foams of uniform cell size. They are hydrophobic and generally comprise from about 2% to about 20% closed cells and correspondingly about 80% to about 98% open cells. The foamed mass produced by a method according to the invention also develops adhesion to a variety of substrates for example epoxy coatings, wax coatings, paint coatings of, for example acrylic and alkyd resins and metal surfaces.

A method according to the invention enables rapid production of low density silicone foam masses which are fire resistant and have sound deadening properties. There is thus a cost saving to the user in that larger volumes of foam can be produced than heretofore per unit volume of composition. In addition, the surprisingly improved adhesion properties of the selected compositions are advantageous in securing the foamed mass in the cavity. The method may find use for example in the automobile and aerospace industries e.g. for the production of in situ formed acoustic foams.

In order that the invention may become more clear, there now follows a description of two example compositions and their use in a method according to the invention. All parts are by weight unless otherwise specified.

The first example composition comprised two parts A and B for admixture in a ratio of 1:1. The part A comprised two $\alpha,\omega$ dihydroxy polysiloxanes namely 24 parts of a first $\alpha,\omega$ dihydroxy polydimethylsiloxane having a viscosity of about 42 mm$^2$/s at 25° C. and 72 parts of a second $\alpha,\omega$ dihydroxy polydimethylsiloxane having a viscosity of about 2000 mm$^2$/s at 25° C., 3 parts n-propyl alcohol and 0.7 part chloroplatinic acid catalyst. The part B comprised 68 parts of the second $\alpha,\omega$ dihydroxy polydimethylsiloxane, 26 parts of trimethylsiloxy endblocked methyl hydrogen polysiloxane having a viscosity of about 30 mm$^2$/s at 25° C. and 6 parts of a surfactant. The surfactant was prepared in a glass reactor equipped with a thermometer, reflux condenser, mechanically driven stirrer and Dean-Stark apparatus to retain a portion of the condensate returning to the reactor, from 123 parts of a 70% solution in xylene of a resinous siloxane copolymer, 10.0 parts of an alcohol having the average formula $F(CF_2)_8CH_2CH_2OH$, 66 parts of xylene, 0.5 part of a solution of potassium hydroxide in ethanol and two parts of an acid clay. The siloxane copolymer consisted essentially of repeating units of the formulae $(CH_2)_3SiO_{\frac{1}{2}}$ and $SiO_{4/2}$ in a molar ratio of about 0.75:1.0, respectively and contained about 0.5% by weight of silicon-bonded hydroxyl groups. The contents of the reactor were heated at the boiling point for one hour, then cooled to 50° C. and neutralized to a pH of about 7 by bubbling carbon dioxide through the reaction mixture. The resultant mixture was then combined with 100 parts of a trimethylsiloxy endblocked polydimethylsiloxane exhibiting a viscosity of 10 mm$^2$/s and a surface tension of $2.03 \times 10^{-4}$ newtons/cm, and the volatile materials were then evaporated under reduced pressure. The resultant clear solution exhibited a surface tension of $1.92 \times 10^{-4}$ newtons/cm and contained a polyorganosiloxane with units of the average formula $F(CF_2)_8CH_2CH_2OSiO_{3/2}$, $(CH_3)_3 SiO_{\frac{1}{2}}$ and $Si_{4/2}$ having about 2.48% silicon-bonded hydroxyl groups.

When the first example composition was formed by mixing the Parts A and B in a ratio of 1:1, the methylhydrogen polysiloxane component of the composition provided 0.39 mole of silicon-bonded hydrogen atoms, the first $\alpha,\omega$ polydimethylsiloxane provided about 0.056 mole silicon-bonded hydroxyl groups, the second $\alpha,\omega$ polydimethylsiloxanes provided about 0.012 mole silicon-bonded hydroxyl groups, the propyl alcohol provided 0.049 mole carbon-bonded hydroxyl groups and the surfactant provided 0.009 silicon-bonded hydroxyl groups. The ratio of silicon-bonded hydrogen atoms to silicon-bonded hydroxyl groups plus carbon-bonded hydroxyl groups in the mixed composition was thus 3.1:1. The viscosity of each of the parts A and B was about 900 mm$^2$/s at 25° C.

Portions of the parts A and B were mixed in a ratio of 1:1 and stirred with a spatula for 10 seconds. The composition cured in 30 seconds to provide a resilient foam having uniform fine cells and having a density of 96 kg/m$^3$. The foam was highly water repellant.

Further portions of the parts A and B were mixed by hand (in a ratio of 1:1) for ten seconds and immediately poured into selected receptacles and the adhesion properties noted.

Foam formed in situ in a metal box section coated with electrophoretically deposited epoxy resin initially showed no adhesion and in fact had a liquid layer on the surface presumably due to the inhibition of the platinum catalyst. Subsequent testing of this box section at high temperature and humidity (50° C./95% RH) showed that over a short period of time, surprisingly, the liquid layer disappeared and a bond developed between the foam and the epoxy surface. This phenomenon was confirmed on an epoxy coated box section which was simply allowed to stand at room temperature (20° C. and an RH of 50%): adhesion developed over a period of 7 days. Foam formed in situ in paper cups coated with wax, developed adhesion to the wax coated paper immediately without any inhibition. Adhesion also developed without any inhibition when foam was cast in a tinned steel box section.

The part A and the part B of the first example composition were separately under a pressure of 2,000 pounds per square inch to the mixing head of an impingement jet mixer supplied by Afros Cannon. The impinging jets were mixed and immediately dispensed into a cavity in a square section mild steel tube closed at its base. The composition cured within 30 seconds of entry to the cavity to provide a fine pored uniform foam having a density of 100 kg/m$^3$. It was found that the foam was strongly adherent to the surfaces of the cavity.

The second example composition was the same as the first example composition except that the second $\alpha,\omega$ polydimethylsiloxane was a material having a viscosity of about 13,500 mm$^2$/s and 12 parts of the surfactant were used, the surfactant being included entirely in the part A. Each of the parts A and B of this second example composition had a viscosity of 5000 mm$^2$/s at 25° C.

The part A and the part B of the second example composition were supplied separately under a pressure of 2,500 pounds per square inch to the mixing head of an impingement jet mixer supplied by Afros Cannon. Air under a pressure of 2.0 Bar was admitted to the mixing head to confer turbulent conditions on the impinging jets. The impinging jets were mixed and immediately dispensed into a cavity in a square section mild steel tube closed at its base. The composition cured within 30 seconds of entry to the cavity to provide a fine pored, uniform foam having a density of 100 kg/m$^3$. It was found that the foam was strongly adherent to the surfaces of the cavity.

The part A and the part B of the second example composition were supplied separately under a pressure of 1,500 pounds per square inch to the mixing head of an impingement jet mixer supplied by Afros Cannon. Air under a pressure of 2.0 Bar was admitted to the mixing head to confer turbulent conditions on the impinging jets. The impinging jets were mixed and immediately dispensed into a curved, partially vertically extending cavity in a section of an automobile wheel arch, the cavity being open at its base and formed from mild steel coated with a paint coating formed from an alkyd resin. The composition cured within 30 seconds of entry to the cavity to provide a fine pored, uniform foam having a density of 100 kg/m$^3$ strongly adherent to the surfaces of the cavity.

That which is claimed is:

1. A method of producing a foamed mass having a density of less than 150 kg/m$^3$ adherent to surfaces of a cavity which comprises inserting into the cavity a foamable composition formed by mixing impinging jets of two or more parts of a foamable silicone composition capable of curing at 20° C. within 2 minutes to provide a foamed mass having a density of less than 150 kg/m$^3$ comprising as its principle or sole components (a) one or more polysiloxanes having not less than three alkyl-hydrogen-siloxane units per molecule, (b) one or more polysiloxanes having not less than two silicon-bonded hydroxyl groups per molecule, (c) one or more compounds having carbon-bonded hydroxyl groups present in a proportion to provide from 0 to 2% by weight of the composition, (d) a polyorganosiloxane comprising $[F(CF_2)_2)_m(CH_2)_nO]_pSiO_{4-p/2}$, $R_3SiO_{\frac{1}{2}}$ and $SiO_{4/2}$ units and silicon-bonded hydroxyl groups wherein each R represents a monovalent hydrocarbon group containing from 1 to 20 carbon atoms, m is an integer having an average value from 1 to 20, n has the value 1 or 2, p has the value 1, 2 or 3 and (e) a platinum catalyst for promoting reaction between the ingredients, the composition being provided as said two or more parts for admixture to form said composition, each of the parts having a similar viscosity at 25° C. one to the other, which is less than 15000 mm$^2$/s and the components being present in the mixed composition in proportions such that the ratio of silicon-bonded hydrogen atoms of said one or more polysiloxanes having not less than three alkyl-hydrogen siloxane units per molecule to silicon-bonded hydroxyl groups and carbon-bonded hydroxyl groups of the other components of the composition lies in the range 1:1 to 6:1.

2. A method according to claim 1 wherein the internal surface of the cavity has a metal surface or a surface on which there is a coating of an epoxy resin, an alkyd resin or a wax.

3. A method according to claim 1 wherein the viscosity of each of the components at 25° C. is less than 2000 mm$^2$/s and the ratio of silicon-bonded hydrogen atoms to silicon-bonded hydroxyl groups and carbon-bonded hydroxyl groups is in the range 2:1 to 5:1.

4. A method according to claim 1 wherein the polysiloxane having alkylhydrogensiloxane units is a polymer having units according to the general formula

$$R_qHSiO_{\frac{3-q}{2}}$$

with or without the presence of R$_2$SiO units in which each R represents a methyl group and q is 1 or 2, and has a viscosity of about 10 to about 100 mm$^2$/s.

5. A method according to claim 1 wherein the polysiloxanes having silicon-bonded hydroxyl groups comprise a silanol terminated polydiorganosiloxane according to the general formula HO((R$_2$)SiO)$_t$H in which each R represents a methyl group and t has a value up to about 25 such that the polysiloxane has a viscosity of about 30 to about 60 mm$^2$/s, optionally together with silanol terminated polydiorganosiloxanes of the general formula HO(R$_2$)(SiO)$_{t'}$H where each R represents a methyl group and t' is an integer such that the polysiloxane has a viscosity of about 50 mm$^2$/s to about 2500 mm$^2$/s.

6. A method according to claim 1 wherein the component (c) is present in the composition and comprises an aliphatic monofunctional alcohol having up to 8 carbon atoms.

7. A method according to claim 1 wherein units of the polyorganosiloxane (d) are present in proportions such that the molar ratio of $R_3SiO_{\frac{1}{2}}$ units to the total number of $[F(CF_2)_m(CH_2)_nO]_pSiO_{(4-p)/2}$ and $SiO_{4/2}$ units is from 0.3 to 1.3.

8. A method according to claim 1 wherein the polyorganosiloxane (d) is the product of treatment of hexamethyldisiloxane coated polysilicates treated with an alcohol $F(CF_2)_8CH_2CH_2OH$ to react with silicon-bonded hydroxyl groups of the polysilicate.

9. A method according to claim 1 wherein a first part of the composition comprises the components (a) and (d) and a portion of component (b), and a second part comprises the remainder of the component (b) and the components (c) and (e), each of the parts has a viscosity of about 1000 $mm^2/s$, and the composition is provided by mixing together impinging jets of the parts in a ratio of 1:1 by volume or 1:1 by weight as desired.

* * * * *